(12) United States Patent
Desai (10) Patent No.: US 7,770,388 B2
(45) Date of Patent: Aug. 10, 2010

(54) HIGH EFFICIENCY 2-STAGE FUEL PUMP AND CONTROL SCHEME FOR GAS TURBINES

(75) Inventor: Mihir C. Desai, Yorba Linda, CA (US)

(73) Assignee: Goodrich Pump & Engine Control Systems, Inc., West Hartford, CT (US)

( * ) Notice: Subject to any disclaimer, the term of this patent is extended or adjusted under 35 U.S.C. 154(b) by 453 days.

(21) Appl. No.: 11/667,741

(22) PCT Filed: Nov. 15, 2005

(86) PCT No.: PCT/US2005/041523

§ 371 (c)(1),
(2), (4) Date: May 14, 2007

(87) PCT Pub. No.: WO2007/044020

PCT Pub. Date: Apr. 19, 2007

(65) Prior Publication Data

US 2008/0289338 A1    Nov. 27, 2008

Related U.S. Application Data

(60) Provisional application No. 60/629,585, filed on Nov. 19, 2004.

(51) Int. Cl.
*F04B 49/06* (2006.01)
(52) U.S. Cl. .......................... 60/420; 60/428
(58) Field of Classification Search ............ 417/3, 417/426, 4, 5, 6; 60/420, 428, 452, 422, 60/405, 734; 91/28; 137/625.69
See application file for complete search history.

(56) References Cited

U.S. PATENT DOCUMENTS

| | | | |
|---|---|---|---|
| 5,118,258 A | * | 6/1992 | Martin .......................... 417/3 |
| 5,168,704 A | | 12/1992 | Kast et al. |
| 5,715,674 A | | 2/1998 | Reuter et al. |
| 5,716,201 A | | 2/1998 | Peck et al. |
| 5,833,438 A | | 11/1998 | Sundberg |

(Continued)

FOREIGN PATENT DOCUMENTS

EP    0 474 585 A1    3/1992

OTHER PUBLICATIONS

International Search Report dated May 9, 2007.

*Primary Examiner*—Michael Cuff
*Assistant Examiner*—Vikansha S Dwivedi
(74) *Attorney, Agent, or Firm*—Scott D. Wofsy; Edwards Angell Palmer & Dodge LLP (57) ABSTRACT

A two-stage system for delivering fuel to a gas turbine including a first stage variable pump for serving as a primary source of fuel, a second stage fixed pump for selectively supplementing the variable pump, a bypass valve connected to the fixed pump for loading and unloading the fixed pump and a regulator valve assembly connected to the variable pump and the bypass valve for controlling operation of the variable pump and the bypass valve. Preferably, the two-stage system also includes a control valve connected to the regulator valve assembly for setting a pressure differential across the regulator valve assembly and, thereby, loading and unloading the fixed pump.

18 Claims, 3 Drawing Sheets

U.S. PATENT DOCUMENTS

| | | | | |
|---|---|---|---|---|
| 6,102,001 | A * | 8/2000 | McLevige | 123/387 |
| 6,786,702 | B2 * | 9/2004 | Zagranski et al. | 417/220 |
| 7,108,493 | B2 * | 9/2006 | Clements et al. | 418/30 |
| 2002/0025257 | A1 | 2/2002 | Zagranski et al. | |
| 2005/0100447 | A1 | 5/2005 | Desai et al. | |

* cited by examiner

HIGH EFFICIENCY 2-STAGE FUEL PUMP AND CONTROL SCHEME FOR GAS TURBINES

CROSS-REFERENCE TO RELATED APPLICATION

This application claims priority to U.S. Provisional Patent Application No. 60/629,585, filed Nov. 19, 2004, and PCT application No. PCT/2005/041523 filed Nov. 15, 2005, each of which is incorporated herein by reference.

BACKGROUND OF THE INVENTION

1. Field of the Invention

The subject invention is directed generally to a system for delivering fluid flow, and more particularly, to a system for using two pumps to efficiently and quickly respond to high transient flow demands at a high pressure without excessive size or weight.

2. Background of the Related Art

In modern gas turbines, fuel pumps need to supply fuel to engine geometries. For example, in mid to larger class engines, linear pistons are used as guide vanes. The linear pistons require a significant source of fuel to slew. This slewing is a transient event that can unacceptably starve the supply of fuel to the engine. Thus, fixed delivery fuel pumps have often been sized to provide excessive fuel flow capacity in order to insure adequate supply to the associated engine. Under most operating conditions, this results in large amounts of pressurized fuel being returned to the pump inlet for recirculation. The return and recirculation results in significant fuel heating due to additional energy being put into the fuel which is subsequently turned into heat as the pressure drops in the recirculation path. In modern designs, fuel heating is a critical issue because the fuel is typically used as a heat exchanger to maintain proper operating temperature. Other methods of heat exchange are undesirable because of the associated size, weight and cost.

Variable displacement fuel pumps have partially overcome the thermal deficiencies of fixed delivery pumps by being able to vary the amount of fuel output. By varying the fuel output, the fuel delivered more closely matches engine demand. Thus, the recirculated flow, along with the heat generated thereby, is reduced. Variable displacement fuel pumps are known in the art as disclosed in U.S. Pat. No. 5,833,438 to Sunberg and U.S. patent application Ser. No. 10/705,362 filed on Nov. 11, 2003, each of which is herein incorporated by reference. A variable displacement pump typically includes a rotor having a fixed axis and pivoting cam ring. Controlling the position of the cam ring with respect to the rotor controls the output of the pump. As a result, the output flow may be controlled by a torque motor operated servo valve acting on the cam ring.

However, the engine operating conditions include transients such as those caused by engine actuator slewing, start-up and the like as would be appreciated by those of ordinary skill in the pertinent art. Under such rapidly varying operating conditions, prior art pump control systems often utilize a portion of the fuel supply to move the cam ring. Because a portion of the supply is subtracted to reset the pump, the resulting response is slow and creates flow disturbances to the engine. Moreover, many prior art pump control systems lack the required stability to reliably provide fuel to the engine. So despite the advances of the state of the art, variable displacement pumps are lacking in stability and still do not respond quickly enough to varying engine demands. As a result, poor performance and inaccurate fuel flow are still common.

Examples of variable displacement pump control arrangements are disclosed in U.S. Pat. Nos. 5,716,201 to Peck et al. and 5,715,674 to Reuter et al., the disclosures of which are herein incorporated by reference in their entirety. These pump control systems attempt to maintain accurate fuel flow throughout the range of engine operating conditions. However, as noted above, such systems still contain inadequacies such as complexity, thermal inefficiency and abrupt shutdowns. It is also undesirable for pump control systems to include sophisticated electronics and numerous additional components that undesirably increase costs and complexity. Still further, these arrangements are often undesirably large. These disadvantages are further magnified in high pressure fueldraulic applications where the fuel pump has to be sized to provide engine geometry and variable nozzle actuators at relatively high pressure (such as 3000-5000 psid) and at the same time provide very fast dynamic response. In such situations, building high capacity pumps has proved difficult and poor performance is typical.

In view of the above, it would be desirable to provide a flow control system which has a robust design for fast response, small size and weight, and accurate regulating of the output with stability and without the associated drawbacks of the prior art.

SUMMARY OF THE INVENTION

The subject technology is directed to a flow control system for a two-stage fuel pump including a regulator valve assembly in fluid communication with an output of fuel from a first stage. The regulator valve assembly has a housing defining a plurality of ports and a spool slidably mounted in the housing for selectively blocking the ports. A bypass valve is operatively connected to a second stage for directing an output of the second stage as well as varying an incremental output of the fixed pump. A control valve varies a pressure differential across the regulator valve assembly to set a position of the spool and, thereby, control the bypass valve and the first stage. Preferably, the first stage is a variable displacement pump and a position of the spool determines an output of said first stage and the second stage is a fixed displacement pump.

In another embodiment, the subject technology is directed to a two-stage system for delivering fuel to a gas turbine including a first stage variable pump for serving as a primary source of fuel, a second stage fixed pump for selectively supplementing the variable pump, a bypass valve connected to the regulator valve assembly and the fixed pump for loading and unloading the fixed pump. A regulator valve assembly is connected to the variable pump and the bypass valve for controlling operation of the variable pump and the bypass valve. Preferably, the two-stage system also includes a control valve connected to the regulator valve assembly for setting a pressure differential across the regulator valve assembly and, thereby, loading and unloading the fixed pump.

In another embodiment, the subject technology is directed to a regulator valve assembly for use in a pump system having a first stage and a second stage. The regulator valve assembly includes a housing defining first, second and third inlets and first, second and third outlets. A multi-part elongated spool is slidably retained in the housing for selectively varying the flow through the inlets and outlets such that when only a first stage is providing output, i) the first inlet is in fluid communication with the first outlet to create a spill return flow to vary an output of the first stage and ii) the second inlet is in fluid communication with the second outlet and the third inlet is in fluid communication with the third outlet 54c to set an output of the second stage at zero. When the first and second stage are providing output, i) the first outlet is blocked to maximize an output of the first stage and ii) the first inlet is in fluid communication with the second outlet and the second inlet is in fluid communication with the third outlet to bring the second stage online. In a further embodiment, the housing defines a fourth inlet in fluid communication with an output of the second stage and a fourth outlet in fluid communication with the fourth inlet to form a spill return flow from the second stage output for providing fast response to varying engine demand when the second stage is online.

It is an object of the present disclosure to increase the fuel metering unit response while maintaining acceptable stability at all operating conditions.

It is another object to provide a fuel pump that is highly efficient with respect to thermal efficiency.

It is another object to provide a fuel pump system with a relatively small size and weight.

It is still another object to provide a fuel metering unit that achieves quick and accurate response to dynamic flow conditions.

BRIEF DESCRIPTION OF THE DRAWINGS

So that those having ordinary skill in the art to which the subject invention appertains will more readily understand how to make and use the same, reference may be had to the Figures.

DETAILED DESCRIPTION OF PREFERRED EMBODIMENTS

Figure 1:
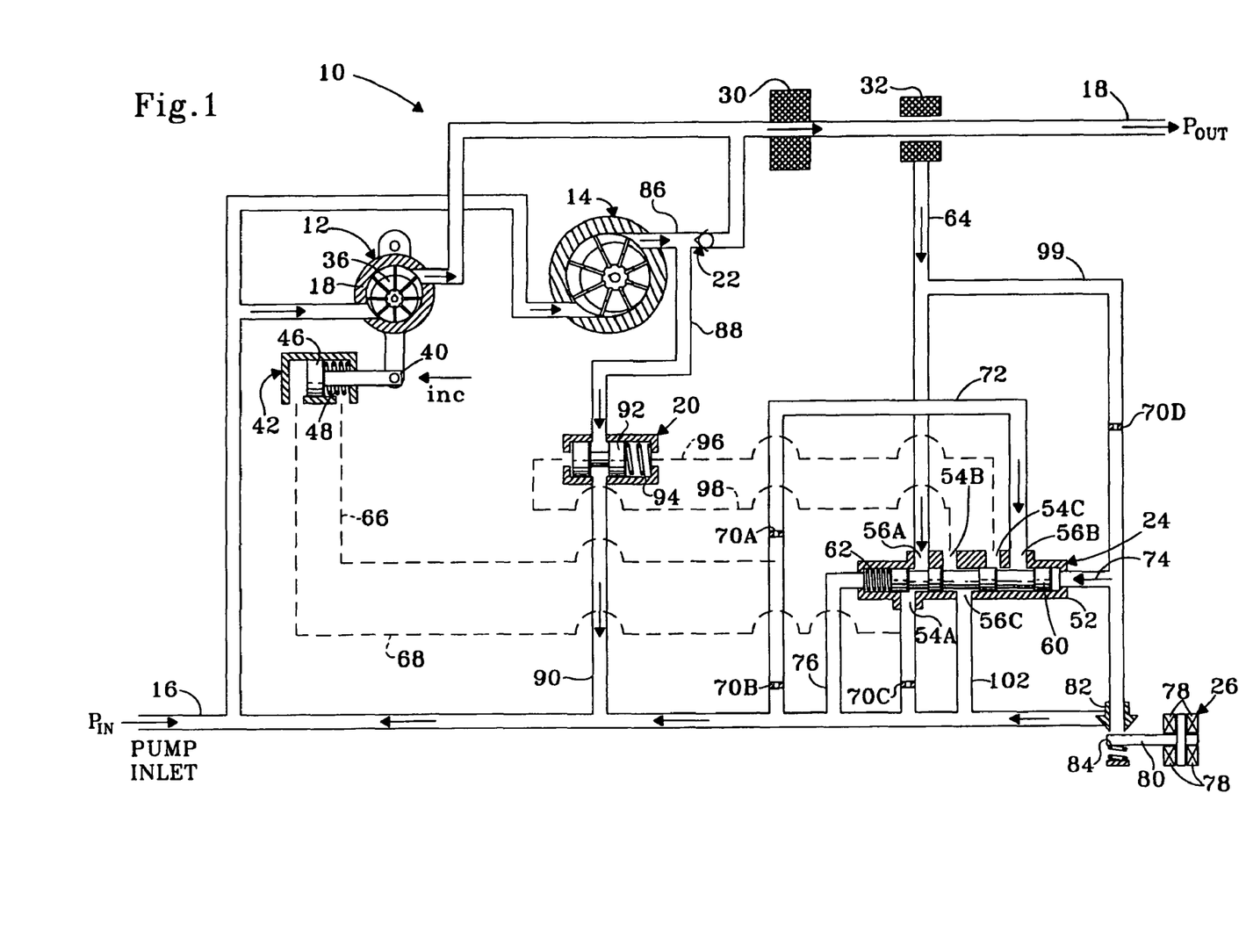
FIG. 1 is a schematic representation of a two-stage fuel pump system using only the first stage in accordance with the subject invention.
Figure 2:
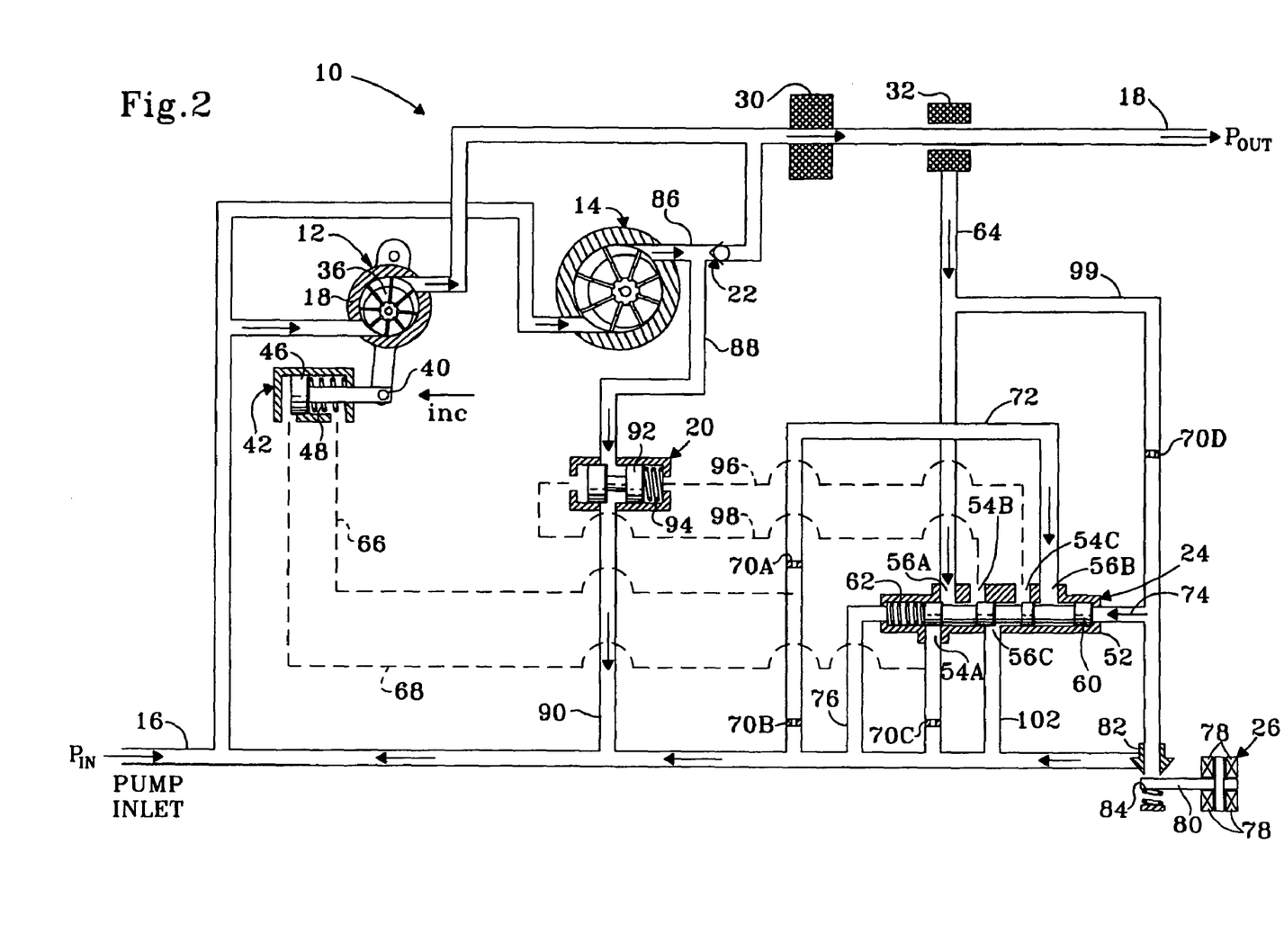
FIG. 2 is a schematic representation of a two-stage fuel pump system using both stages in accordance with the subject invention.

For clarity throughout the following description, arrows are shown within the lines of the FIGS. 1 and 2 to indicate the direction in which the fuel flows and an annotated letter "P" is shown to indicate pressure at certain locations. All relative descriptions herein such as left, right, up, and down are with reference to the Figures, and not meant in a limiting sense. Additionally, for clarity common items such as filters and shut off solenoids have not been included in the Figures as would be appreciated by those of ordinary skill in the pertinent art.

Referring now to FIG. 1, there is illustrated a schematic representation of a two-stage fuel pump system in accordance with the subject invention which is designated generally by reference numeral 10. In brief overview, the two-stage system 10 uses a variable first stage for steady-state operating conditions. During transient conditions that exceed the capacity of the first stage, a second fixed stage supplements the flow of the first stage to meet the high transient flow demand of the gas turbine engine. As a result, the second stage is largely inactive and the two-stage system 10 is highly efficient. In one embodiment, the first stage is relatively smaller than the second stage but operates at a high pressure. The two-stage system 10 being balanced allows designing a lower pressure second stage with an increase in capacity at the high pressure of the first stage when the second stage comes on line.

The two-stage system 10 controls the output flow of a variable vane displacement pump 12 (e.g., the first stage) and a fixed displacement vane pump 14 (e.g., the second stage) to provide fast response to transient engine needs yet excessive complexity is avoided. The variable pump 12 and the fixed pump receive fuel flow via an inlet 16 at an inlet pressure $P_{IN}$. The two-stage system 10 delivers fuel flow via an outlet 18 at an output pressure $P_{OUT}$. The two-stage system 10 also includes a bypass valve 20 and check valve 22 for loading and unloading the fixed pump 14. A regulator valve assembly 24 controls the operation of the variable pump 12 as well as the bypass valve 20 and, in turn, the check valve 22. A control valve 26 sets the pressure across the regulator valve assembly 46. Wash filters 30, 32 in line with the outlet 18 clean the fuel. In another embodiment, the outlet 18 also provides fuel to a plurality of locations not shown such as engine actuators and bleed band servos as required.

The variable pump 12 includes a rotor 36 and a pivoting cam ring 38. For a detailed description of a variable displacement vane pump, see U.S. patent application Ser. No. 09/867,359 filed May 29, 2001 which is incorporated herein by reference in its entirety. The variable pump 12 also has a piston 40 operatively connected to the cam ring 38 to control the position of the cam ring 38 relative to the rotor 36, and, thereby, vary the output flow of the variable pump 12. A cam actuator assembly 42 positions the piston 40. It would be appreciated by those of ordinary skill in the art that other types of actuators similarly and differently arranged would perform this same function and are, therefore, well within the scope of the subject invention as claimed. The maximum flow setting of the variable pump 12 occurs when the piston 40 is moved the maximum distance to the left as indicated by the arrow pointing towards the increased output direction.

The cam actuator assembly 42 houses a ring or valve member 46 operatively connected to the piston 40 for dividing the interior thereof. The cam actuator assembly 42 is preferably a half area servo, e.g., each side of the ring 46 has equal pressure. A spring 48 biases the piston 40 by pushing against the ring 46. The combination of the pressure differential between the right and left sides of the ring 46 within the cam actuator assembly 42 and the sizing of the spring 48 positions the piston 40 within the cam actuator assembly 42. As the piston 40 moves, the cam ring 18 moves to vary the output of the variable pump 12. Preferably, the spring 48 is sized and configured to position the piston 40 and, in turn, the cam ring 18 at maximum flow for start up of the variable pump 12. Throughout two-stage system 10, it is envisioned that springs are sized as a function of the product of piston area and fuel pressure as would be appreciated by those of ordinary skill in the art and therefore not further described herein.

The regulator valve assembly 24 works in conjunction with the cam actuator assembly 42 to ultimately set the output of the two-stage system 10. The regulator valve assembly 24 has a housing 52. The housing 52 defines three outlet ports 54A, 54B, 54C and three inlet ports 56A, 56B, 56C. The housing 52 slidably retains a multi-part elongated spool 60 for selectively varying the flow through ports 54A-C, 56A-C. In a preferred embodiment, to vary the flow of the regulator valve assembly 24, the spool 60 includes four valve sections for selectively blocking and/or sealing the ports 54A-C, 56A-C. The spool 60 is operatively connected to a spring assembly 62 for biasing the spool 60 within the housing 52. Preferably, the spring assembly 62 biases the spool 60 towards maximum flow of the variable pump 12, i.e., to the right.

A line 64 connects the output of the variable pump 12 and the fixed pump 14 to inlet port 56A of the regulator valve assembly 24. Further, line 66 connects the output of the two-stage system 10 to the right side of the cam actuator assembly 42. The left side of the cam actuator assembly 42 is connected to outlet port 54A of the regulator valve assembly 24 by line 68. As a result, the junction pressures within the regulator valve assembly 24 feed the cam actuator assembly 42 to determine the position of the ring 46. In effect, outlet port 54A of the regulator valve assembly 24 serves as variable orifice in the flow circuit to the cam actuator assembly 42. Thus, the lines 68, 66 control the variable pump 12 as two constantly flowing parallel orifice legs. Preferably, each leg has two equal area orifices in series for maintaining equal pressure (half of $P_{OUT}$–$P_{IN}$) on either side of the actuator piston 46 when the system is in equilibrium. Movement of the spool 60 of the regulator valve assembly 24 in response to a flow demand changes the effective orifice (port 54A) in leg 68 of the circuit and appropriately ports pressure in left chamber of cam actuator assembly 42 to move the piston 46 and change the displacement of the variable pump 12 to satisfy system flow demand. At any equilibrium state of the system when the flow demand is satisfied by the variable stage, the spool 60 position is always such that half pressure exists on either side of actuator piston 46. It is envisioned that orifices (not shown) may be necessary to limit the flow into lines 68, 66 and elsewhere along with other necessary items, such as metering head adjustments and the like. Such common items may be advantageously employed as would be appreciated upon review of the subject disclosure but such items are not shown for simplicity.

Four orifices 70A-D are shown. Orifices 70A and 70B are of equal size to always port half of $P_{OUT}$–$P_{IN}$ pressure on the right of actuator piston 46. The absolute size of 70A,70B is governed by pump leakage and dynamic response criteria. Orifice 70C is sized for desired dynamic response characteristic and in any equilibrium configuration when the system flow demand is satisfied by the variable stage, the valve spool 60 nulls out with an opening on port 54A whose size is equal to area of orifice 70C.

Another line 72 connects the output in line 64 to inlet port 56B of the regulator valve assembly 24. Line 74 also connects the output of the two-stage system 10 to the right end of the housing 52 of the regulator valve assembly 24 to act on the spool 60 therein. At the left end of the regulator valve assembly 24, not only is the spring assembly 62 acting on the spool 60 but line 76 connects the low pressure inlet flow thereto. Thus, the pressure differential between $P_{OUT}$ and $P_{IN}$, the spring assembly 62 and the flow through ports 54A-C, 56A-C combine to set the position of the spool 60 within the housing 52. In one embodiment, the regulator valve assembly 24 regulates a 150 psid differential.

It is envisioned that one or more sensors (not shown), such as linear variable displacement transducers and pressure sensors, provides signal(s) to an electronic engine controller (not shown, hereinafter "EEC"). Based upon the sensor signal(s), the EEC sets a control valve 26. In a preferred embodiment, the control valve 26 is a jet pipe torque motor assembly. The control valve 26 varies the pressure across the regulator valve assembly 24. The control valve 26 includes dual coils 78 for moving a flapper 80. A nozzle 82, which receives fuel at pressure $P_{OUT}$ from the variable pump 12, releases fuel against the flapper 80 to further set the position of the flapper 80. In addition, a spring assembly 84 also biases the flapper 80. Fuel that exits the nozzle 82 reenters the two-stage system 10 through collection into the low reference pressure $P_{IN}$. Preferably, the spring assembly 84 provides a biasing force onto the flapper 80 such that without current to the coils 78, the nozzle 82 is closed. The control valve 26 is sized and configured to require a small amount of current to overcome the force exerted by the spring assembly 84 on the flapper 80. Thus, by applying current to the coils, the flapper 80 is moved to selectively open the nozzle 82 and, thereby, determine the output of the two-stage system 10.

The output of the fixed pump 14 passes through the check valve 22 in line 86. The output of the fixed pump 14 is also connected to a bypass valve 20 via line 88. When the bypass valve 20 is open, the output of the fixed pump 14 passes through the bypass valve 20 and returns to mix with the inlet flow via line 90, i.e., the unloaded condition. The bypass valve 20 houses a valve member 92, which is biased normally open by a spring assembly 94. Lines 96, 98 connect opposing sides of the bypass valve 20 with outlet port 54B and outlet port 54C, respectively, of the regulator valve assembly 24.

Steady-State Operation

Still referring to FIG. 1, during steady-state operation with the variable pump 12 operating at or below maximum capacity, the fixed pump 14 is off-line or unloaded. The fixed pump 14 is unloaded to low pressure ($P_{IN}$) through the open bypass valve 20 via lines 88, 90. The engine demand is substantially constant and met by the variable pump 12. Accordingly, the variable pump 12 is preferably sized to satisfy all engine steady-state operating conditions.

When the engine demand is substantially constant, the output of the variable pump 12 is substantially constant. Thus, $P_{OUT}$ in line 64, which is an input to the regulator valve assembly 24, is substantially constant. Further, the EEC provides a steady signal to the control valve 26 that is a measure of the demanded pump pressure rise. In effect, the signal to the control valve 26 in combination with the steady $P_{OUT}$ in line 99, the flapper 80 is held substantially stationary to maintain consistent pressure in line 74 and, thereby, set the pressure across the regulator valve assembly 46. Consequently, the spool 60 of the pressure regulating valve 46 remains stationary.

When the spool 60 is substantially stationary, pressure in lines 66, 68 also remains constant to steadily hold the cam actuator assembly 42 and, thereby, the output of the variable pump 12 in a steady-state condition. In other words, the two-stage system discharge pressure satisfies the force balance on the spool 60 (which is a function of demanded flow), such that half pressure occurs on both sides of the cam actuator assembly 42. In a preferred embodiment, at null when the output of the two-stage system 10 satisfies the regulator valve setting as set by the control valve 26, outlet port 54A is open with an area equal to that of a 0.06 inch diameter orifice to result in half pressure in both sides of the cam actuator assembly 42.

At the regulator valve assembly 24, variable pump discharge pressure is ported to the right side of the bypass valve 20 from outlet port 54C via line 96 whereas low pressure $P_{IN}$ is ported to the left side of the bypass valve 20 from outlet port 54B via line 98. As a result, the bypass valve 20 is fully open to unload the fixed pump 14. With the fixed pump discharge pressure being low, the check valve remains closed.

Operation During Transient Events

Referring still to FIG. 1, when a transient event occurs, the combination of the regulator valve assembly 24 and the control valve 26 achieve a fast response by varying the output of the variable pump 12 and, if necessary, bringing the fixed pump 14 on-line. In effect, the two-stage system 10 has a mechanical ability to respond in combination with the ability of the EEC to set a position of the control valve 26. By using the variable pump 12 as a primary fuel source and connecting the fixed pump 14 therewith to selectively supplement the output, control is stable with no issues related to load sharing between the variable pump 12 and the fixed pump 14.

When a minor transient event occurs that requires increased output, which can be satisfied by the variable pump 12, the two-stage system 10 responds to increase the output of the variable pump 12. The requirement for additional output can manifest in several ways such as by an increase in cam actuator flow demand, the EEC signaling the control valve 26 to move the flapper 80 downward or both. The movement causes reduced pressure in line 74 such that the spool 60 of the regulator valve assembly 24 strokes to the right and, in turn, the area of outlet port 54A is decreased. The area of the outlet port 54A decreasing reduces the size of the effective orifice in series with orifice 70C, in effect, reducing the pressure in the left chamber of the cam actuator assembly 42 causing piston 46 to stroke to the left and moving the cam 18 of variable pump 12 to displace more flow to satisfy system demand. In addition, the pump system discharge flow in line 68 is decreased and the pump output flow is proportionally increased, i.e., a proportional effect occurs.

The reduction in flow in line 68 decreases the junction pressure fed into the left side of the cam actuator assembly 42 to below half pressure. Under such circumstances, the ring 46 of the cam actuator assembly 42 strokes to the left and, in turn, the discharge of the variable pump 12 is increased, i.e., an integral effect, until the variable pump 12 satisfies the demanded flow. When the variable pump 12 satisfies the demanded flow, line 64 brings increased pressure in line 99 to the right side of spool 60 to return the spool 60 to the left. As a result, the force on the ring 46 of the cam actuator assembly 42 balances with the current flapper position, i.e., the two-stage system 10 returns to the condition of the cam actuator assembly 42 having half pressure conditions in both sides.

During this response, variable pump discharge pressure is ported to the right side of the bypass valve 20 from outlet port 54C via line 96 whereas low pressure $P_{IN}$ is ported to the left side of the bypass valve 20 from outlet port 54B via line 98. As a result, the bypass valve 20 is fully open to substantially completely unload the fixed pump 14. With the fixed pump discharge pressure being low, the check valve 22 remains closed.

In the alternative, when the variable pump 12 produces excess flow, such as by a decrease in cam actuator flow demand, the EEC signals the control valve 26 to move the flapper upward to reduce the pressure differential across the regulator valve assembly 24. In line 74, pressure increases such that the spool 60 of the regulator valve assembly 24 strokes to the left and, in turn, the area of outlet port 54A is increased. Correspondingly, the two-stage system discharge flow in line 68 is increased and the pump output flow is proportionally decreased. The increased in flow in line 68 raises the junction pressure fed into the left side of the cam actuator assembly 42 to above half pressure. Under such circumstances, the ring 46 of the cam actuator assembly 42 strokes to the right and, in turn, the piston 40 moves to the right to decrease the discharge of the variable pump 12 until the variable pump output is reduced to match the demanded flow.

Similar to the increased adjustment noted above, when the variable pump output matches the demanded flow, the force on the spool 60 of the regulator valve assembly 24 balances out to return the spool 60 to a null position and the condition within the cam actuator assembly 42 reestablishes the half pressure condition. The variable pump discharge pressure is ported to the right side of the bypass valve 20 from inlet port 56C via line 96 whereas low pressure $P_{IN}$ is ported to the left side of the bypass valve 20 from outlet port 54B via line 98. Again, the bypass valve 20 is fully open to unload the fixed pump 14. With the fixed pump discharge pressure being low, the check valve 22 remains closed.

Referring now to FIG. 2, when the needs of the engine drive the variable pump 12 to maximum output, a smooth, bumpless transition to bring the fixed pump 14 on line occurs. The mechanics for this transition to include the fixed pump 14 are incorporated in the regulator valve assembly 24 that moves the cam actuator assembly 42, and the bypass valve 20. In response to increased demand, the two-stage system 10 responds as noted above until the variable pump 12 reaches maximum output, i.e., the variable pump 12 is saturated with the cam actuator assembly 42 at maximum offset. The saturation of the variable pump 12 starts a chain of events which rapidly leads to an increase in the output of the two-stage system 10 by bringing the fixed pump 12 on-line.

With demanded flow exceeding supply, the spool 60 of the regulator valve assembly 24 strokes to the right and completely closes outlet port 54A. As a result, the piston 40 of the cam actuator assembly strokes all the way to the left but a decrease in pressure in the lines 64, 99 remains. Preferably, a maximum flow stop (not shown) is provided on the cam actuator assembly 42 and the ring 46 is against the flow stop in this condition. With outlet port 54A closed, the two-stage system discharge in line 64 is redirected to outlet port 54B. Consequently, the two-stage system discharge passes to the left side of the bypass valve 20 via line 98 while low pressure $P_{IN}$ is fed to the right side of the bypass valve 20 from line 102 through inlet port 56C via line 96. In effect, the bypass valve 20 becomes regulated by the differential between outlet port 54B and outlet port 54C. With a pressure imbalance across the spool 92 of the bypass valve 20, the spool 92 strokes to the right and, in turn, the bypass valve 20 is closed or at least partially blocked.

With the bypass valve 20 closed or at least partially blocked, the output of the fixed pump 14 creates a pressure build up in line 86 to open the check valve 22. When the check valve 22 opens, the output of the fixed pump 14 combines and augments the output of the variable pump 12. Preferably, the check valve 22 opens at a pressure that is slightly higher than the variable pump discharge pressure. In one embodiment, outlet port 54B and outlet port 54C of the regulator valve assembly 24 are sized and configured to have low gains at null for bypass valve stability. Thus, any transients, which may tend to cause spool 60 overshoots, do not build sufficient back pressure on the fixed pump 14 to close the check valve 22.

The additional output produced by the fixed pump 14 is under regulation by slight opening of outlet port 54B to discharge and outlet port 54C. In addition, as noted above, the control valve 26 still sets a pressure in line 102 and, in turn, sets a pressure in line 96 to vary the amount bypassed in line 90 as desired by the EEC in combination with the mechanical feedback to adjust the two-stage system output. Thus, the two-stage system 10 still efficiently responds to varying engine demand even though the demand is consistently above the capacity of the variable pump 12. The variable pump 12 output remains saturated during this condition.

Referring now to FIGS. 1 and 2, as smoothly and rapidly as the two-stage system 10 utilizes the fixed pump 14 to supplement the output, the two-stage system 10 returns to using only the variable pump 12. For example, when a transient event passes, the two-stage system 10 must produce less fuel to prevent excessive heat generation, so the EEC responds by adjusting the control valve 26 to move the flapper 80 upward. The flapper motion, in combination with the excess pump system output, cause an increase in pressure in line 64. By way of line 74, the increased pressure causes the spool 60 of the regulator valve assembly 24 to stroke to the left, opening outlet port 54A As a result, line 98 is ported to $P_{IN}$ through the pressure regulator while $P_{OUT}$ in line 72 is ported from inlet port 56B through outlet port 54C to via line 96 to the right side of the bypass valve 20. With the pressure across the spool 92 reset, the spool 92 of the bypass valve 20 strokes to the left and, in turn, the bypass valve 20 is opened.

With the bypass valve 20 opened, again the output of the fixed pump 14 unloads. As the variable pump 12 is still saturated and the two-stage system output exceeds demand, pressure increases in line 74 such that the valve member 60 of the regulator valve assembly 24 strokes to the left and, in turn, the area of outlet port 54A is increased. Correspondingly, the pump system discharge flow in line 68 is increased and the pump output flow is proportionally decreased.

The increased in flow in line 68 raises the junction pressure fed into the left side of the cam actuator assembly 42 to above half pressure. Under such circumstances, the ring 46 of the cam actuator assembly 42 strokes to the right and, in turn, the discharge of the variable pump 12 is decreased until the variable pump output is reduced to match the demanded flow in a manner to that similar as noted above. In summary, the two-stage system 10 rapidly and smoothly increases and decreases the output in response to engine transients while reducing undesirable thermal effects in a relatively smaller configuration.

Figure 3:
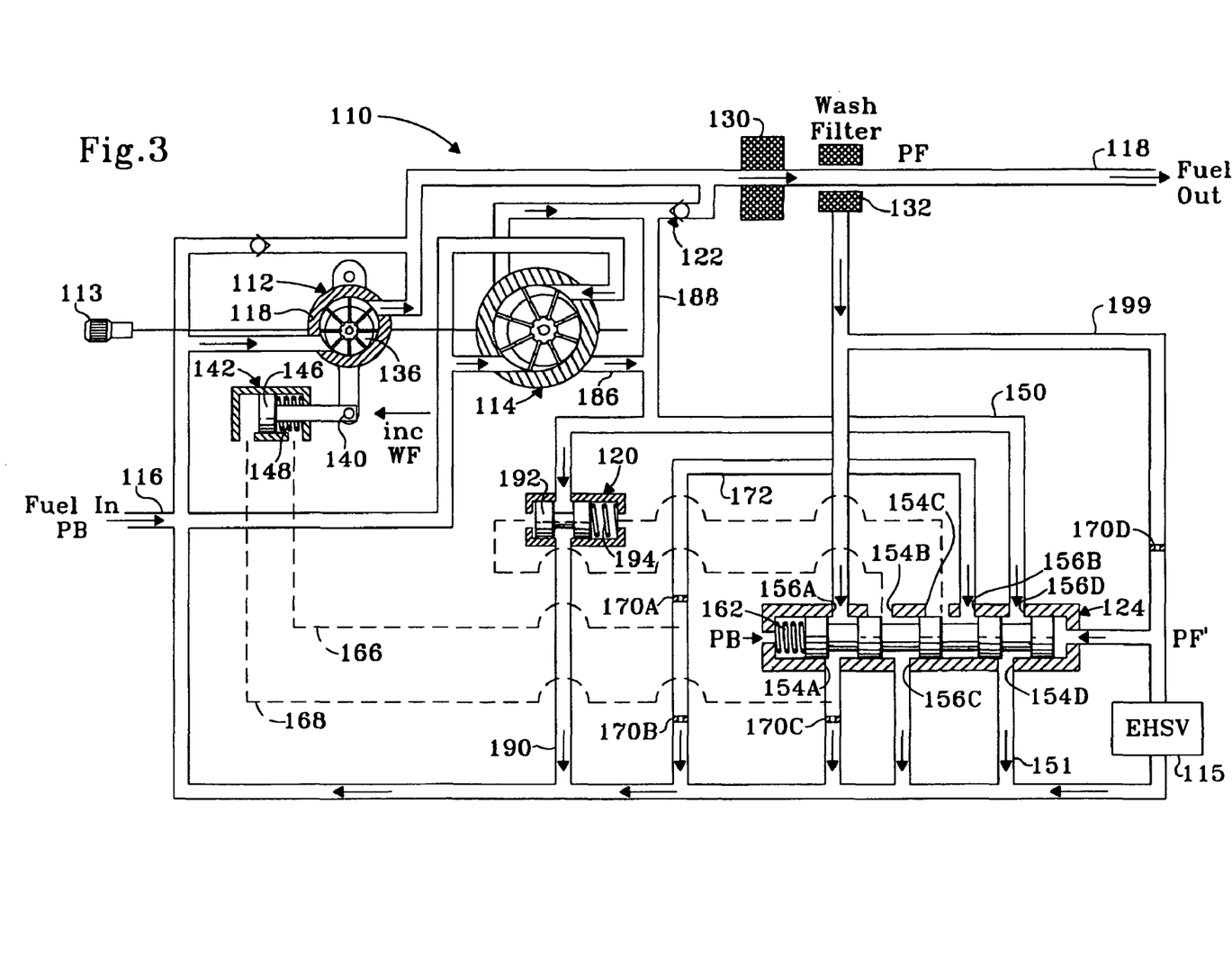
FIG. 3 is a schematic representation of another two-stage fuel pump system in equilibrium in accordance with the subject invention.

Now referring to FIG. 3, another two-stage system is shown in equilibrium and referred to generally by the reference numeral 110. As will be appreciated by those of ordinary skill in the pertinent art, the two-stage system 110 utilizes the same principles of the two-stage system 10 described above. Accordingly, like reference numerals preceded by the numeral "1" are used to indicate like elements whenever possible and, for simplicity, the following description is primarily directed to the differences. The primary difference of the two-stage system 110 in comparison to the two-stage system 10 is the additional utilization of a proportional spill port to increase the two-stage system 110 response to varying demand when the variable pump 112 is saturated. In contrast, the two-stage system 10 above only used the integral and relatively slower response of the bypass valve 20 for regulation. As shown, the outlet port 154A is at a null position. The fixed pump 114 is also a duel inlet, duel outlet design.

The regulator valve assembly 124 still works in conjunction with the cam actuator assembly 142 to set the output of the two-stage system 110 as noted above but includes additional ports 154D, 156D in the housing 152 to accomplish the improved response during saturation. Correspondingly, the regulator valve assembly 124 houses a longer spool 160 for selectively varying the flow through ports 154D, 156D. The longer spool 160 includes five valve sections for selectively blocking and/or sealing the ports 154A-D, 156A-D. A line 150 connects the discharge of fixed pump 114 to inlet port 156A of the regulator valve assembly 124. Further, a line 151 connects outlet 154D to the low pressure inlet line.

Similar to above, movement of the spool 160 of the regulator valve assembly 124 in response to a flow demand changes the effective orifice (port 154A) in leg 168 of the circuit and appropriately ports pressure in the left chamber of cam actuator assembly 142 to move the ring 146 and change the displacement of the variable pump 112 to satisfy system flow demand. In FIG. 3, a drive shaft 113 from the engine gearbox (not shown) drives the pumps 112, 114. Further, the two-stage system 110 has an electo hydraulic servo valve (EHSV) 115 that is preferably a two stage flapper system for providing higher force capability.

At equilibrium state of the two-stage system 110, when the flow demand is satisfied by the variable pump 112, the spool 160 position is always such that half pressure exists on either side of the ring 146. When the spool 160 strokes to the left as a result of excess output, inlet port 156D allows the fixed pump discharge to flow through the regulator valve assembly 124, thereby reducing pressure and facilitating closing the check valve 122. Alternatively, when the spool 160 strokes to the right in response to more fuel demand, inlet port 156D becomes partially or completely blocked to maintain pressure in line 150, thereby facilitating opening of the check valve 122.

When the check valve 122 is open (e.g., the fixed pump 114 is online), the bypass valve 120 and proportional spill ports 154D function to quickly vary the output of the two-stage system 110. More particularly, if engine demand exceeds supply, the spill return flow in line 150 is reduced to meet the demand. Simultaneously, but with lag due to an integral response time, the bypass valve 120 responds to eventually reset the incremental output of the fixed pump 114. Conversely, when engine demand decreases, the spill return flow in line 150 immediately increases so that the output of the two-stage system 110 matches demand until the bypass valve 120 responds appropriately.

As would be appreciated by those of ordinary skill in the pertinent art, the subject technology is applicable to use as a main fuel pump and actuator pump (fuel and hydraulic) with significant advantages for high flow, high pressure applications. The functions of several elements may, in alternative embodiments, be carried out by fewer elements, or a single element. Similarly, in some embodiments, any functional element may perform fewer, or different, operations than those described with respect to the illustrated embodiment. Also, functional elements (e.g., wash filters, check valves and the like) shown as distinct for purposes of illustration may be incorporated within other functional elements, separated in different hardware or distributed in various ways in a particular implementation. Further, relative size and location are merely somewhat schematic and it is understood that not only the same but many other embodiments could have varying depictions.

As would be appreciated by those of ordinary skill in the art, the two-stage systems above operate in a pressure regulating mode. Alternatively, the subject technology can be easily adapted to operate in a fuel metering mode. While the subject invention has been described with respect to preferred embodiments, those skilled in the art will readily appreciate that various changes and/or modifications can be made to the invention without departing from the spirit or scope of the invention as defined by the appended claims.

What is claimed is:

1. A two-stage system for delivering fuel to a gas turbine comprising:
   a variable pump for serving as a primary source of fuel to an outlet of the two-stage system;
   a fixed pump connected to the outlet for selectively supplementing the variable pump;
   a bypass valve connected to the fixed pump for loading and unloading the fixed pump as well as varying an incremental output of the fixed pump; and
   a regulator valve assembly connected to the variable pump and the bypass valve for controlling operation of the variable pump and the bypass valve, and, thereby, the fixed pump, wherein in a first mode of operation, only the variable pump provides fuel to meet demand, and in a second mode of operation, when the demand exceeds the fuel provided by the variable pump, the variable pump and the fixed pump provide fuel to meet demand.

2. A two-stage system as recited in claim 1, further comprising a control valve connected to the regulator valve assembly for setting a pressure differential across the regulator valve assembly and, thereby, loading and unloading the fixed pump.

3. A two-stage system as recited in claim 2, wherein the control valve is a jet pipe torque motor assembly controlled by an electronic engine controller.

4. A two-stage system as recited in claim 1, further comprising a check valve connected to an output of the fixed pump.

5. A two-stage system as recited in claim 4, wherein when the bypass valve closes, an output of the fixed pump creates a pressure build to open the check valve such that, the output of the fixed pump augments an output of the two-stage system.

6. A two-stage system as recited in claim 4, wherein the check valve opens at a pressure that is slightly higher than a discharge pressure of the variable pump.

7. A two-stage system as recited in claim 1, wherein the variable pump includes a pivoting cam ring to vary an output of the variable pump, a piston operatively connected to the cam ring to control the position of the cam ring and a cam actuator assembly to position the piston, wherein the cam actuator is operatively connected to the regulator valve assembly.

8. A two-stage system as recited in claim 7, wherein the cam actuator assembly is a half area servo.

9. A two-stage system as recited in claim 7, wherein the spool of the regulator valve assembly strokes to substantially redirect an output of the variable pump from the cam actuator assembly to the bypass valve to maximize the output of the variable pump and to close the bypass valve and, thereby, load the fixed pump.

10. A two-stage system as recited in claim 1, wherein the regulator valve assembly has a housing that defines three outlet ports and three inlet ports and a multi-part elongated spool slidably retained in the housing for selectively varying the flow through the outlet and inlet ports.

11. A two-stage system as recited in claim 1, wherein when the bypass valve is open, an output of the fixed pump passes through the bypass valve to mix with a low pressure area of the two-stage system.

12. A two-stage system as recited in claim 1, wherein when the bypass valve is closed, an output of the fixed pump passes is provided to the gas turbine.

13. A flow control system for a two-stage fuel pump comprising:
(a) a regulator valve assembly in fluid communication with an output of fuel from a first stage, the regulator valve assembly including:
   i) a housing defining a plurality of ports; and
   ii) a spool slidably mounted in the housing for selectively blocking the ports;
(b) a bypass valve operatively connected to the regulator valve assembly and a second stage for directing an output of the second stage; and
(c) a control valve for varying a pressure differential across the regulator valve assembly to set a position of the spool and, thereby, control the bypass valve and the first stage such that the first stage is normally on and the second stage is selectively activated to supplement the output of the first stage, wherein the first stage is a variable displacement pump and a position of the spool determines an output of said first stage, and wherein the second stage is a fixed displacement pump.

14. A flow control system as recited in claim 13, wherein the control valve is a torque motor assembly including:
(i) a flapper;
(ii) a nozzle associated with the flapper and in fluid communication with the regulator valve and an output of the two-stage system such that a position of the flapper sets the position of the spool; and
(iii) a coil assembly for setting a position of the flapper in response to a signal from an engine controller.

15. A flow control system as recited in claim 13, wherein the regulator valve assembly defines three inlet ports and three outlet ports.

16. A flow control system as recited in claim 13, wherein the regulator valve assembly defines four inlet ports and four outlet ports.

17. A regulator valve assembly for use in a pump system having a first stage and a second stage, the regulator valve assembly comprising:
a housing defining first, second and third inlets and first, second and third outlets; and
a multi-part elongated spool slidably retained in the housing for selectively varying the flow through the inlets and outlets;
wherein when only a first stage is providing output, i) the first inlet is in fluid communication with the first outlet to create a spill return flow to vary an output of the first stage and ii) the second inlet is in fluid communication with the second outlet and the third inlet is in fluid communication with the third outlet to set an output of the second stage at zero,
wherein when the first and second stage are providing output, i) the first outlet is blocked to maximize an output of the first stage and ii) the first inlet is in fluid communication with the second outlet and the second inlet is in fluid communication with the third outlet to bring the second stage online wherein the first stage is a variable displacement pump, and wherein the second stage is a fixed displacement pump.

18. The regulator valve assembly of claim 17, wherein the housing further defines a fourth inlet in fluid communication with an output of the second stage and a fourth outlet in fluid communication with the fourth inlet to form a spill return flow from the second stage output for providing fast response to varying engine demand when the second stage is online.

\* \* \* \* \*